Figure 1:
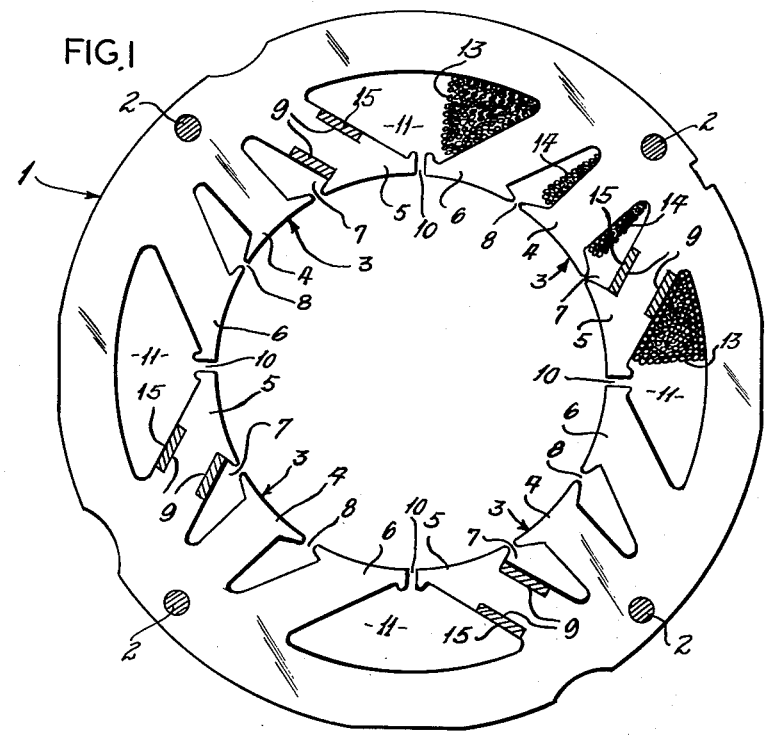

Oct. 31, 1961   H. D. ARNOLD ET AL   3,007,068
SHADED POLE MOTOR
Filed Oct. 20, 1958

INVENTORS:
HAROLD D. ARNOLD
JOHN W. HAMMANN

By Sutherland, Pohl & Taylor
ATTORNEYS.

3,007,068
SHADED POLE MOTOR
Harold D. Arnold, Bellefontaine Neighbors, and John W. Hammann, St. Louis, Mo., assignors to The Emerson Electric Manufacturing Company, St. Louis, Mo., a corporation of Missouri
Filed Oct. 20, 1958, Ser. No. 768,473
8 Claims. (Cl. 310—172)

This invention relates to shaded pole induction motors.

Shaded pole induction motors are used extensively, particularly in the small motor field. Such motors are distinguished by having a shading coil, generally formed of a single closed turn of highly conductive material, embracing a portion of each pole. The shading coil provides a phase displacement with respect to the main portion of the pole, which tends to produce a rotating field and thereby provides a starting torque for the motor.

One of the problems involved in shaded pole motor design is the fact that, as a practical matter, an increase in starting torque obtained by increasing the shaded pole area, is accompanied by lower running efficiency. Another difficulty has arisen from the fact that a strong third harmonic field is created, the intensity of which is believed to be in proportion to the distortion of the main flux pattern. This third harmonic tends to make the motor run synchronously at one-third normal synchronous speed, and above this one-third speed, it introduces a negative torque which tends to prevent the motor from coming up to speed. This dip in the torque available for the load presents a serious problem in those applications of the motor in which the load increases with the speed of the motor. The dip in torque may cause the torque available at the bottom of the dip to be less than the load; in that situation, the motor cannot come up to speed, since the motor will slow down until the torque again exceeds the load, and thus will never pass the point of the third harmonic dip.

Numerous solutions have been offered for this problem, including the increasing of the starting torque, which, as has been pointed out, results in a lower running efficiency, and the varying of the air gap between the rotor and the pole face, as in the patent to Ballentine, No. 2,591,117.

One of the objects of this invention is to provide a shaded pole motor in which the third harmonic dip is substantially reduced while at the same time the running efficiency is increased, as compared with such motors known heretofore.

Another object is to provide such a motor in which the air gap between the rotor and pole face may be made constant.

Other objects will become apparent to those skilled in the art in the light of the following description and accompanying drawing.

We have discovered that in general, contrary to what has been thought heretofore (cf. Oldenkamp, No. 2,845,553), in a shaded pole motor, with the rotor conductors in place, the flux is concentrated near the pole tips and is least dense near the center of the pole. For the locked-rotor condition, the flux density at the tips may be two or more times as great as that at the center. The distribution of the flux is modified somewhat by the shading coil, which in addition to causing a phase displacement, also causes a slight reduction in the flux density at the shaded tip of the pole over that at the unshaded tip, but by and large, the variation of flux across the pole appears to be caused by the current in the rotor conductors. We have found that, in general, the flux distribution depends upon the speed, the number of poles, the shading, the rotor resistance and reactance, the air gap between the rotor and stator, and the size of the motor. The condition of unevenness becomes more aggravated as the size of the motor increases and as the number of poles decreases.

In accordance with this invention, generally stated, a shaded pole motor is provided in which the third harmonic is decreased and the motor performance enhanced by the use of supplemental running winding in the form of one or more coils on each pole so constructed as to increase the flux density beneath the area of the face of the pole intermediate the pole tips.

Figure 2:
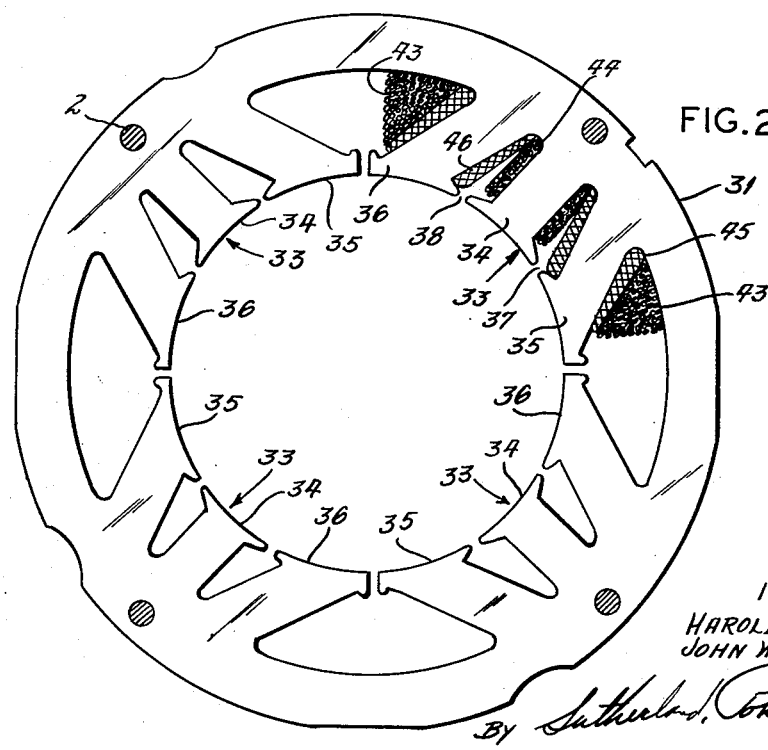

In the drawing,

FIG. 1 is a sectional view, taken in a plane perpendicular to the central axis, of one embodiment of stator constructed in accordance with this invention, partially wound; and FIG. 2 is a sectional view, taken in a plane perpendicular to the central axis, of another embodiment of stator constructed in accordance with this invention, partially wound.

Referring now to FIGURE 1 of the drawing for one illustrative embodiment of this invention, reference numeral 1 indicates a stator of a four pole, shaded pole motor. A rotor, not here shown, is mounted concentrically within the stator, and is of standard construction, with conductor bars shorted on each other, as by an integrally cast end ring.

The stator is preferably made up of a number of laminations of magnetic material, one of which is shown in FIG. 1, held together, in this embodiment, by rivets 2. The laminations may be held together in any other suitable way.

The stator 1 has four poles 3. Each of the poles 3 is made up of a center pole section 4, a shaded pole section 5 and a tip section 6. The shaded pole section 5 is separated by a slot 7 from the center pole section 4. The tip section 6 is separated by a slot 8 from the center pole section 4. In this embodiment, the shaded pole section 5 is notched on each side to provide channels 9. A conventional shading coil 15, of solid copper or other highly conductive material, lying in the channels 9, embraces the shaded pole section 5. The term "shading coil" is used herein to embrace both a shading coil with a single turn and a shading coil with a plurality of turns.

Each of the poles 3 is separated from its immediately adjacent poles by a gap 10 at the face of the pole, leading into a fan-shaped open area 11, which accommodates a main running winding 13, a portion of which is shown. The main winding 13, which embraces the pole 3, can be a conventional running winding.

The slot 7 between the pole section 4 and the shaded pole section 5, and the slot 8, between the center pole section 4 and the tip section 6, are large, and accommodate a supplemental winding 14, wound around the center pole section 4. The supplemental winding 14 is an additional coil of the main pole winding.

While the theory of its operation forms no part of this invention, it is believed that in the usual shaded pole motor the decrease in the flux density in the center of the pole face is caused by the demagnetizing influence of the flux generated by the current flowing through the conductor bars of the rotor, and that in the motor of the present invention, the supplemental winding, by increasing the flux density at the center of the pole face, reduces the distortion of the flux pattern.

In any event, the provision of supplemental running winding about the center section of the pole reduces the effect of the third harmonic and the objectionable negative torque caused by this third harmonic at a speed a little above one-third synchronous motor speed.

Referring now to FIG. 2, for another embodiment of this invention, a stator 31 is provided with poles 33, each with a center pole section 34 and two, mirror image shaded pole sections 35 and 36. Each of the shaded pole sections 35 and 36 is provided with a wound shading coil 45 and 46, respectively.

A main running winding 43 encompasses both shading coils 45 and 46. A supplemental running winding 44 extends around the center pole section 34, between the inner reaches of the shading coils 45 and 46.

The provision of the two wound shading coils 45 and 46 makes the motor reversible. When the shading coil 45 is energized, the shading coil 46 is disconnected, and the motor runs in one direction. When the shading coil 46 is energized, the shading coil 45 is disconnected, and the motor runs in the opposite direction. The particular electrical connections by which this is accomplished, are well known to the art.

In each of the embodiments shown and described, the supplemental running winding is electrically connected in such a way that the flux of the main running winding is complemented by that of the supplemental running winding. The supplemental running winding may be connected in series or in parallel with the main running winding, but the former is the simpler, and for that reason the preferred, method.

While it is one of the great advantages of the stator of this invention that it can be, and preferably is, made with a circular bore, so as to provide a uniform air gap with the rotor, still it is possible to chamfer or otherwise cut away the face of one or both of the pole tips to provide a non-uniform air gap, in addition to the supplemental center winding. Illustrations of such non-uniform air gaps are found in Ballentine, No. 2,591,117 and Oldenkamp, No. 2,845,555.

The stator of this invention may, of course, have more than four poles. The supplemental runing winding can be positioned asymmetrically with respect to the radial center line of the pole, by positioning the slots which define the tip or shaded pole sections, or both, asymmetrically with respect to the radial center line of the pole. Such an arrangement is indicated by the fact that the flux distribution, at the pole tips, is not entirely symmetrical, due to the influence of the shading coil, although as a practical matter, the difference in flux density beneath the two pole tips is small as compared with the difference between the flux density beneath the tips and that beneath the center of the pole face, in the absence of the supplemental winding of this invention. A plurality of supplemental coils may also be provided.

Numerous other variations in the construction of the stator of this invention, within the scope of the appended claims, will occur to those skilled in the art in the light of the foregoing disclosure.

Having thus described the invention, what is claimed and desired to be secured by Letters Patent is:

1. In a shaded pole motor, the improvement comprising a stator having a plurality of poles with shading coils, each of said poles having a main running winding embracing said pole and supplemental running winding encompassed by the said main running winding, said supplemental winding being physically separated from said main running winding by a part of said pole.

2. In a shaded pole motor, the improvement comprising a stator having a plurality of poles defining a circular bore, each of said poles having a shading coil and having a main running winding embracing said pole and supplemental running winding encompassed by said main running winding, said supplemental winding being physically separated from said main running winding by a part of said pole.

3. In a shaded pole motor, the improvement comprising a stator having a plurality of poles each of which has a shaded pole section and a shading coil embracing said section, a main running winding embracing the perimeter of said pole outboard of said shaded pole section, and supplemental running winding inboard of the shaded pole section and encompassed by the main running winding.

4. In a shaded pole motor, the improvement comprising a stator having a plurality of poles each of which has a shaded pole section defined in said pole by a slot, a shading coil in said slot and embracing said shaded pole section, a main running winding embracing the pole, outboard of said shaded pole section, and supplemental running winding, one reach of which extends within the slot defining the shaded pole section, inboard of said shaded pole section, said supplemental running winding being encompassed by the main running winding.

5. In a shaded pole motor, the improvement comprising a stator having a plurality of poles each of which has two slots, one of which defines a shaded pole section, a shading coil around said shaded pole section, a main running winding embracing the pole, outboard of said shaded pole section, and a supplemental winding lying in the said slots, inboard of said shaded pole section.

6. In a shaded pole motor, the improvement comprising a stator having a plurality of poles, each of said poles having a center section and two shaded pole sections separated from said center section by enlarged slots, said shaded pole sections being mirror images symmetrically arranged at either side of said center section, at least one of said shaded pole sections having a shading coil around it, a main winding embracing said shaded pole sections, and a supplemental running winding within the slots defining the said center section.

7. In a shaded pole motor, the improvement comprising a stator having a plurality of poles each of which has two slots, one defining a shaded pole section and the other defining a tip section, a shading coil embracing said shaded pole section, a main winding embracing the pole outboard of said shaded pole and tip sections, and a supplemental winding in said slot, inboard of said shaded pole and tip sections.

8. In a motor having a plurality of poles each of which is embraced by a main winding, said poles being of sufficient width normally to result in a non-uniform flux distribution across their face, with the greatest flux density at the tips thereof, the improvement comprising means, inboard of said main winding, for additively supplementing the flux density inboard of the tips of said poles.

References Cited in the file of this patent
UNITED STATES PATENTS

| | | |
|---|---|---|
| 2,487,688 | Bishofberger | Nov. 8, 1949 |
| 2,683,230 | Michelson | July 6, 1954 |
| 2,827,582 | Krebs | Mar. 18, 1958 |